(12) United States Patent  (10) Patent No.: US 10,309,506 B2
Janson et al.  (45) Date of Patent: Jun. 4, 2019

(54) MULTIPLE-MODE CONTINUOUSLY VARIABLE TRANSMISSION

(71) Applicant: Ford Global Technologies, LLC, Dearborn, MI (US)

(72) Inventors: David Allen Janson, Plymouth, MI (US); Donald Edward Hoffman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 323 days.

(21) Appl. No.: 15/155,631

(22) Filed: May 16, 2016

(65) Prior Publication Data

US 2017/0328452 A1  Nov. 16, 2017

(51) Int. Cl.
*F16H 37/00* (2006.01)
*F16H 37/02* (2006.01)
*F16H 9/12* (2006.01)
*F16H 37/08* (2006.01)

(52) U.S. Cl.
CPC .............. *F16H 37/022* (2013.01); *F16H 9/12* (2013.01); *F16H 37/0846* (2013.01); *F16H 2037/023* (2013.01); *F16H 2037/025* (2013.01); *F16H 2037/0886* (2013.01)

(58) Field of Classification Search
CPC ....................................................... F16H 37/00
See application file for complete search history.

(56) References Cited

U.S. PATENT DOCUMENTS

| 3,340,749 | A | 9/1967 | Magg et al. |
| 3,442,346 | A * | 5/1969 | Mann ..................... B60K 17/08 180/247 |
| 4,644,820 | A | 2/1987 | Macey et al. |
| 4,856,369 | A | 8/1989 | Stockton |
| 7,473,202 | B2 * | 1/2009 | Morscheck ......... F16H 37/0833 475/208 |
| 9,909,657 | B2 * | 3/2018 | Uchino ................. F16H 37/021 |
| 2009/0017959 | A1 * | 1/2009 | Triller ................... F16H 37/021 475/210 |
| 2011/0015833 | A1 * | 1/2011 | Urata .................... F16H 37/022 701/51 |
| 2015/0308552 | A1 | 10/2015 | Mellet et al. |

FOREIGN PATENT DOCUMENTS

| FR | 3014985 A | 6/2015 |
| JP | 116554 A | 1/1999 |

* cited by examiner

*Primary Examiner* — Tisha D Lewis
(74) *Attorney, Agent, or Firm* — James Doltavio; Brooks Kushman P.C.

(57) ABSTRACT

A continuously variable transmission includes four shift elements to establish three forward driving ranges and one reverse driving range. Two of the forward driving ranges utilize recirculating power flow paths in which the power transmitted through the variator is much smaller than the power transmitted by the transmission. Both variator sheaves rotate about axes that are offset from the input axis such that neither sheave is partially submerged in transmission fluid.

18 Claims, 3 Drawing Sheets

MULTIPLE-MODE CONTINUOUSLY VARIABLE TRANSMISSION

TECHNICAL FIELD

This disclosure relates to the field of automotive transmissions. More particularly, the disclosure pertains to a gearing arrangement for a continuously variable transmission with multiple operating modes.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Various ways of varying the speed ratio of a transmission are known. Some transmissions have a collection of gearing and shift elements configured such that engaging various subsets of the shift elements establish various power flow paths between an input shaft and an output shaft. These various power flow paths operate at different speed ratios between the input shaft and the output shaft. To change from one speed ratio to another speed ratio, one or more shift elements are disengaged and one or more shift elements are engaged in order to change which power flow path is utilized. Other transmissions utilize a variator to change speed ratio. A variator is capable of efficiently transmitting power at any speed ratio between an upper and lower limit and changing the speed ratio gradually while transmitting power. The upper and lower speed ratio limits of the variator may not match the speed ratio requirements of the vehicle. In that case, a transmission with a variator may also include gearing and shift elements such that the range of available speed ratios between the input shaft and the output shaft match vehicle requirements. The mechanism used to adjust the speed ratio influences the sensations experienced by vehicle occupants, including engine noise and vehicle acceleration.

SUMMARY

A continuously variable transmission includes an input, a variator, and four shift elements. The variator includes first and second sheaves that are supported about axes offset from the axis of the input. The four shift elements are configured to establish low, mid-range, high, and reverse power flow paths from the input to an output. In the mid-range and reverse power flow paths, all power transmitted from the input to the out may be transmitted by the variator from the first sheave to the second sheave. In the low and high power flow paths, some power may recirculate, flowing from the second sheave to the first sheave. The transmission may include a first gear fixed to the input and meshing with a second gear fixed to the first sheave. The transmission may further include an intermediate shaft supported for rotation on the axis of the second sheave and held against rotation by a brake. The transmission may further include a simple planetary gearset coaxial to the second sheave and having a sun gear fixed to the second sheave, a ring gear driveably connected to the output, and a carrier fixed to the intermediate shaft. The transmission may further include third and fourth gears rotating about the input axis and selectively coupled to the input and meshing with fifth and sixth gears, respectively, fixedly coupled to the intermediate shaft.

A transmission includes an input on a first axis, a variator configured to transmit power between sheaves located on second and third axes, and a controller. The controller is programmed to launch a vehicle in a forward direction using a first recirculating power flow path, shift from the first recirculating power flow path to a first non-recirculating power flow path, and then shift from the first non-recirculating power flow path to a second recirculating power flow path. These shifts may be performed without changing the speed ratio between a transmission input and a transmission output. The controller may be further programmed to launch the vehicle in a reverse direction using a second non-recirculating power flow path.

DETAILED DESCRIPTION

Figure 1:
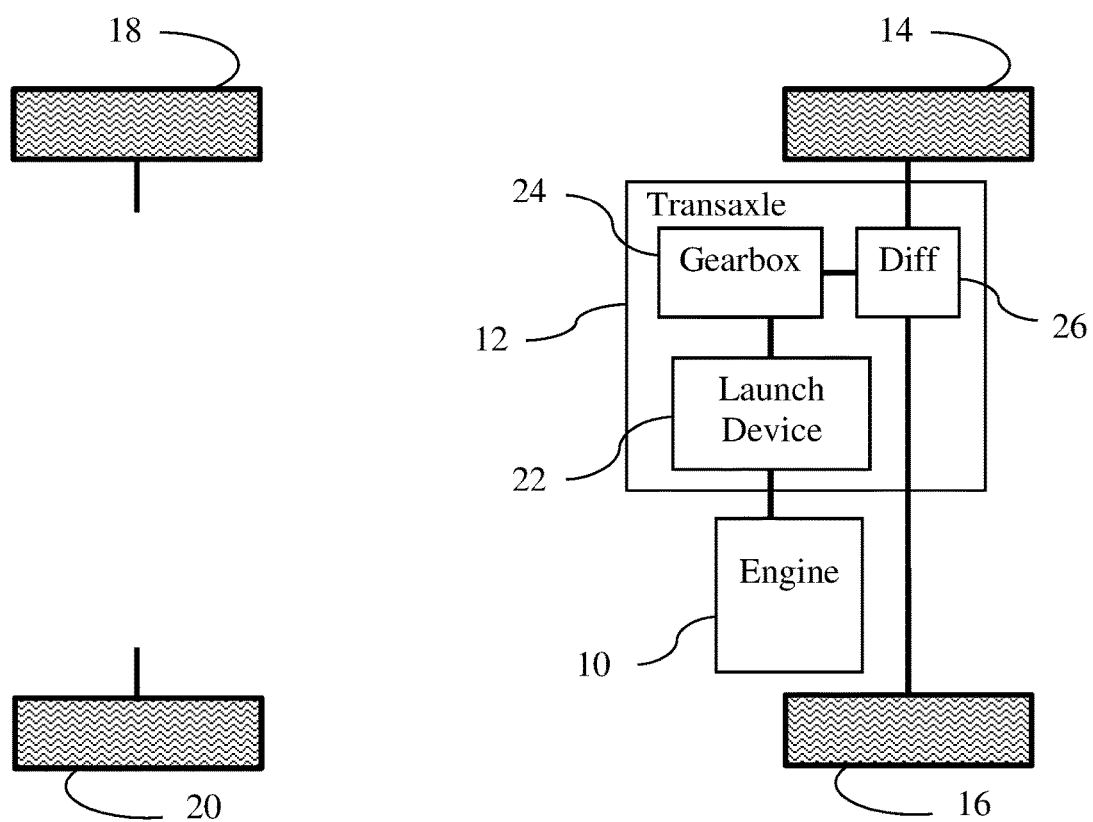
FIG. 1 is a schematic diagram of an exemplary vehicle powertrain.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A gearing arrangement is a collection of rotatable elements and shift elements configured to impose specified speed relationships among the rotatable elements. Some speed relationships, called fixed speed relationships, are imposed regardless of the state of any shift elements. Other speed relationships, called selective speed relationships, are imposed only when particular shift elements are fully engaged. A linear speed relationship exists among an ordered list of rotatable elements when i) the first and last rotatable element in the list are constrained to have the most extreme speeds, ii) the speeds of the remaining rotatable elements are each constrained to be a weighted average of the first and last rotatable element, and iii) when the speeds of the rotatable elements differ, they are constrained to be in the listed order, either increasing or decreasing. The speed of a rotatable element is positive when the element rotates in one direction, negative when the rotatable element rotates in the opposite direction, and zero when the rotatable element is stationary.

A group of rotatable elements are fixedly coupled to one another if they are constrained to have the same speed in all operating conditions. Rotatable elements can be fixedly coupled by spline connections, welding, press fitting, machining from a common solid, or other means of direct or indirect connection. Slight variations in rotational displacement between fixedly coupled elements can occur such as displacement due to lash or shaft compliance. One or more rotatable elements that are all fixedly coupled to one another may be called a shaft.

In contrast, two rotatable elements are selectively coupled by a shift element when the shift element constrains them to have the same speed whenever the shift element is fully engaged and the rotatable elements are free to have different speeds in at least some other operating condition. A shift element that holds a rotatable element against rotation by selectively coupling it to a fixed housing is called a brake. A shift element that selectively couples two or more rotatable elements to one another is called a clutch. Shift elements may be actively controlled devices such as hydraulically or electrically actuated clutches or brakes or may be passive devices such as one way clutches or brakes. Shift elements may be positive engagement devices such as dog clutches or friction devices capable of transmitting torque between elements in the presence of relative rotation. Two rotatable elements are coupled if they are either fixedly coupled or selectively coupled.

FIG. 1 illustrates a front wheel drive (FWD) powertrain layout. Engine 10 converts chemical energy stored in liquid fuel into mechanical power to exert torque on a crankshaft. Transaxle 12 adapts the mechanical power from the crankshaft to exert torque on front wheels 14 and 16. Rear wheels 18 and 20 are not powered unless additional hardware is provided. Transaxle 12 includes several components including a launch device 22, a gearbox 24, and a differential 26. Launch device 22 permits transmission of torque even when the vehicle is stationary. Launch device 22 may be, for example, a torque converter or a launch clutch. Gearbox 24 is controlled to establish various speed ratios between the launch device output and the differential input. Ideally gearbox 24 will have very low parasitic losses and be able to establish a speed ratio such that engine 10 generates the required power at its most efficient crankshaft speed. In practice, most gearboxes have upper and lower ratio limits. Also, many gearboxes are only able to establish a finite number of speed ratios between these upper and lower limits. Differential 26 divides the power from the gearbox between left and right front wheels 14 and 16, providing approximately equal torque to each while accommodating slight speed differences when the vehicle turns a corner.

Several types of variator are known in the art. These variator types differ from one another in several respects including: range of ratio variability, torque transfer capacity, whether the input and output rotate in the same direction or the opposite direction, and whether the input and the output rotate about the same axis. A belt variator includes two adjustable sheaves, a driving sheave and a driven sheave, supported for rotation about two parallel axes. Each sheave may include two conical halves separated by a variable distance. A continuous belt with a relatively constant length and width frictionally engages both sheaves. As the two conical halves of a sheave are pushed together, the belt moves radially outward relative to the sheave's axis. Conversely, as the two conical halves of a sheave move apart, the belt moves radially inward relative to the sheave's axis. The belt transfers power from the driving sheave to the driven sheave at a speed ratio and torque ratio dictated by the radius of the frictional engagement point on each sheave. Since the two sheaves rotate in the same direction, a belt variator is an axis changing, direction preserving type of variator. To increase the speed of the output relative to the input, the conical halves of the driving sheave are pushed closer together and the conical halves of the driven sheave are pushed apart. The radius of the frictional contact on the driving sheave increases while the radius of the frictional contact on the driven sheave decreases.

The torque capacity of a variator is the maximum input torque at which the variator can operate. If the input torque exceeds the torque capacity, the belt may slip relative to one of the sheaves. The torque capacity is impacted by the size of the sheaves, the pressure applied to squeeze the belt between the conical halves of each sheave, and the present speed ratio of the variator. A particular belt variator design is also characterized by a range of variation as measured by the ratio of the most underdrive speed ratio to the most overdrive speed ratio. The design of a variator may require trade-offs among various features such as torque capacity, range of variation, and space requirements.

Speed ratio is defined as input speed divided by output speed. Torque ratio is defined as output torque divided by input torque. For a 100% efficient variator, the speed ratio is equal to the torque ratio. In practice, variators have some parasitic losses. These parasitic losses include slip between the belt and the sheaves and drag on the belt and sheaves. The drag on the belt and sheaves tends to be much higher if some parts of the variator operate in a fluid bath.

Figure 2:
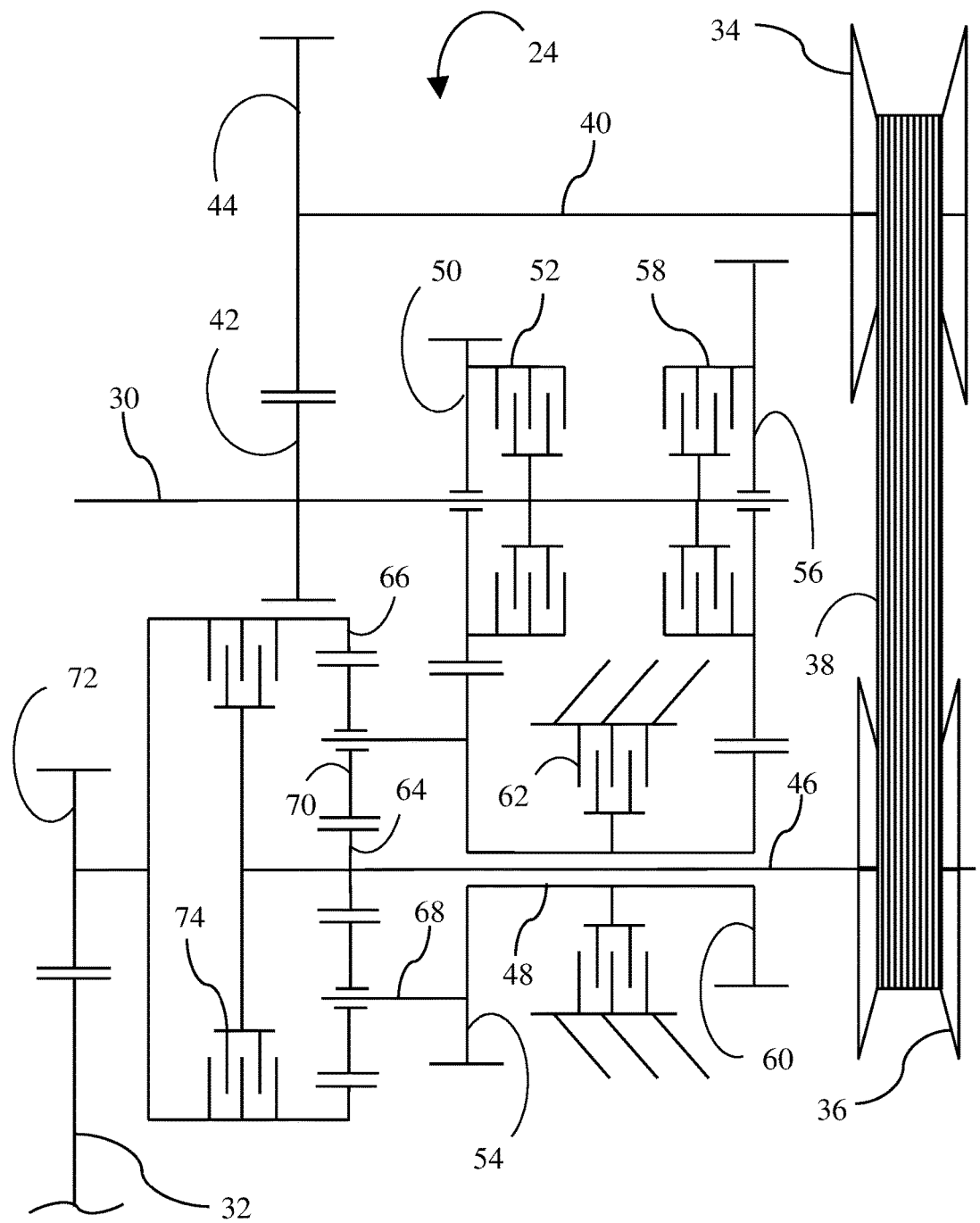
FIG. 2 is a schematic diagram of a continuously variable transmission suitable for use in the powertrain of FIG. 1.

FIG. 2 illustrates a first embodiment of a continuously variable gearbox 24. Gearbox 24 is configured to transmit power from input shaft 30, which is fixed to the output of the launch device, to output gear 32, which is fixed to the input of the differential. Gearbox 24 uses a combination of layshaft gearing, planetary gearing, shift elements, and a belt variator. The belt variator includes sheave 34, sheave 36, and a belt 38. Shaft 40 is supported on an axis that is parallel to and offset from the axis of input shaft 30. Gear 42 is fixedly coupled to input shaft 30 and meshes with gear 44 which is fixedly coupled to shaft 40. Sheave 34 is fixedly coupled to shaft 40. This gearing constrains sheave 34 to rotate in the opposite direction of input shaft 30 at a speed proportional to the speed to shaft 30.

Shafts 46 and 48 are supported on an axis that is parallel to and offset from the axes of input shaft 30 and of shaft 40. Shaft 48 is a hollow shaft through which shaft 46 extends. Shaft 46 is fixedly coupled to sheave 36, such that shaft 46 rotates in the same direction as shaft 40 at a speed ratio determined by the variator ratio. Gear 50 is selectively coupled to input shaft 30 by clutch 52 and meshes with gear 54 which is fixedly coupled to hollow shaft 48. When clutch 52 is fully engaged, hollow shaft 48 is constrained to rotate in the opposite direction of input shaft 30 at a speed ratio determined by the tooth counts of gears 50 and 54. Gear 56 is selectively coupled to input shaft 30 by clutch 58 and meshes with gear 60 which is fixedly coupled to hollow shaft 48. When clutch 58 is fully engaged, hollow shaft 48 is constrained to rotate in the opposite direction of input shaft 30 at a speed ratio determined by the tooth counts of gears 56 and 60. Shaft 48 is selectively held against rotation by brake 62.

Gearbox 24 includes a simple planetary gear set including sun gear 64 which is fixedly coupled to shaft 46, ring gear 66, carrier 68 which is fixedly coupled to hollow shaft 48, and a set of planet gears 70. Ring gear 66 is fixedly coupled to gear 72 which meshes with output gear 32. The planetary gear set imposes a fixed linear speed relationship among shaft 46, shaft 48, and gear 72. Clutch 74 selectively directly couples sun gear 64 to ring gear 66. When clutch 74 is fully engaged, sun gear 64, carrier 68, and ring gear 66 are constrained to rotate at the same speed. The same effect of operatively selectively coupling all three planetary elements to one another can be obtained by a clutch selectively directly coupling carrier 68 to either sun gear 64 or ring gear 66. Table 1 illustrates suggested tooth number ratios for various gears.

TABLE 1

| Gear 42/Gear 44 | 1.00 |
|---|---|
| Gear 50/Gear 54 | 0.50 |
| Gear 56/Gear 60 | 2.00 |
| Gear 66/Gear 64 | 3.00 |
| Sheave 34/Sheave 36 | 0.50-2.00 |

When in neutral, all shift elements 52, 58, 62, and 74 are disengaged. Sheave 34 rotates at the same speed as input 30, but in an opposite direction. Negligible torque is transferred because no power flow path between input shaft 30 and output gear 72 is established. Consequently, if the launch device is a torque converter, input shaft 30 will rotate at a speed close to the speed of the engine. The variator ratio of a belt variator may only be adjustable when the sheaves are rotating. To prepare for forward vehicle launch in low mode, the variator ratio is set at approximately 1.00 and then clutch 52 is engaged. As clutch 52 is engaged, with output gear 72 stationary, all of the rotatable elements of gearbox 24 are brought to a stop. The speed ratio across the torque converter causes torque to be transferred to input shaft 30. In this condition, gearbox 24 multiplies this torque by approximately 3.00 at output gear 72.

Once the vehicle begins to move, input shaft 30 will rotate at 3.00 times the speed of output gear 72. A recirculating power flow pattern is established. The power that flows into carrier 68 from gear 54 is split by the planetary gear set between output gear 72 (via ring gear 66) and sheave 36 (via sun gear 64). The power that flows into sheave 36 is transmitted through the belt variator and added to the input power by gear 42. As the vehicle accelerates, the controller gradually changes the variator ratio from 1.00 to 2.00, which changes the speed ratio of gearbox 24 from 3.00 to 2.00. Once the variator ratio is 2.00, sheave 36 and sun gear 64 rotate at 0.50 times the speed of input shaft 30. Gears 50 and 54 cause carrier 68 to also rotate at 0.50 times the speed of input shaft 30. The planetary gearset then causes ring gear 66 and output gear 72 to rotate at 0.50 times the speed of the input.

To further decrease the speed ratio, gearbox 24 is shifted into a mid-range mode. In the mid-range mode, clutch 74 is engaged and clutch 52 is released. When the speed ratio is 2.00 in low range mode, the speed difference across clutch 74 is zero. In this state, clutch 74 can be engaged before disengaging clutch 52 without creating a tie-up condition. Once clutch 74 is engaged with all other shift elements disengaged, the mid-range mode is established and all power flows through the variator. In the mid-range mode, the gearbox speed ratio is equal to the variator ratio. The speed ratio of the transmission may be adjusted between 2.00 and 0.50 in the mid-range mode.

Upon reaching the 0.50 speed ratio in mid-range mode, the transmission may be shifted into a high mode providing even more overdrive. To shift into high mode, the variator ratio is set to 0.50, clutch 58 is engaged, and then clutch 74 is released. In high mode, as with low mode, a recirculating power flow path is established. As the variator ratio is adjusted from 0.50 to 2.00, the transmission speed ratio changes from 0.50 to 0.33.

To prepare for reverse vehicle launch, the variator ratio is set at 2.00 and then brake 62 is engaged. In reverse, all power flows through the variator. The variator multiplies the torque by 2.00 and the planetary gearbox multiplies the torque by 3.00 for a total torque multiplication of 6.00. As the vehicle accelerates, the variator ratio is adjusted to avoid excessive engine speed.

This gearbox arrangement provides several advantages. First, a wide range of transmission ratios is possible with a relatively narrow range variator. With the tooth numbers of Table 1, the transmission span is 7.50 using a variator with a span of only 4.00. This permits the variator designer to emphasize attributes such as torque capacity and packaging while still providing the necessary span for vehicle performance and fuel economy. Furthermore, in low and high mode, the torque transmitted by the variator is a fraction of gearbox input torque. Consequently, the gearbox torque capacity in these modes is much higher than in a simple CVT.

The tooth number ratios and variator parameters are merely suggestions which may be revised to modify transmission characteristics. For example, the tooth number ratios may be adjusted such that the transmission ratio ranges of the operating modes overlap slightly. When the desired transmission ratio is in the overlap region, the controller could choose whichever mode provided higher efficiency, could choose the mode with better torque capacity, or could remain in the present mode as long as possible to reduce the number of shifts. Although shifts with no ratio change are described above, shifts can be accomplished with a ratio change using control strategies presently used in step-ratio transmissions. Alternatively, tooth numbers may be selected such that the various ranges do not intersect, increasing the overall span. In that case, shifts would be performed with some ratio change.

If the ratio ranges for mid-range mode and high mode have at least some intersection, then clutches 74 and 58 do not need to be friction clutches. If the variator is used to synchronize the clutch in advance of engagement, then dog clutches may be used. Dog clutches require less packaging space and produce less parasitic loss than friction clutches when open.

Figure 3:
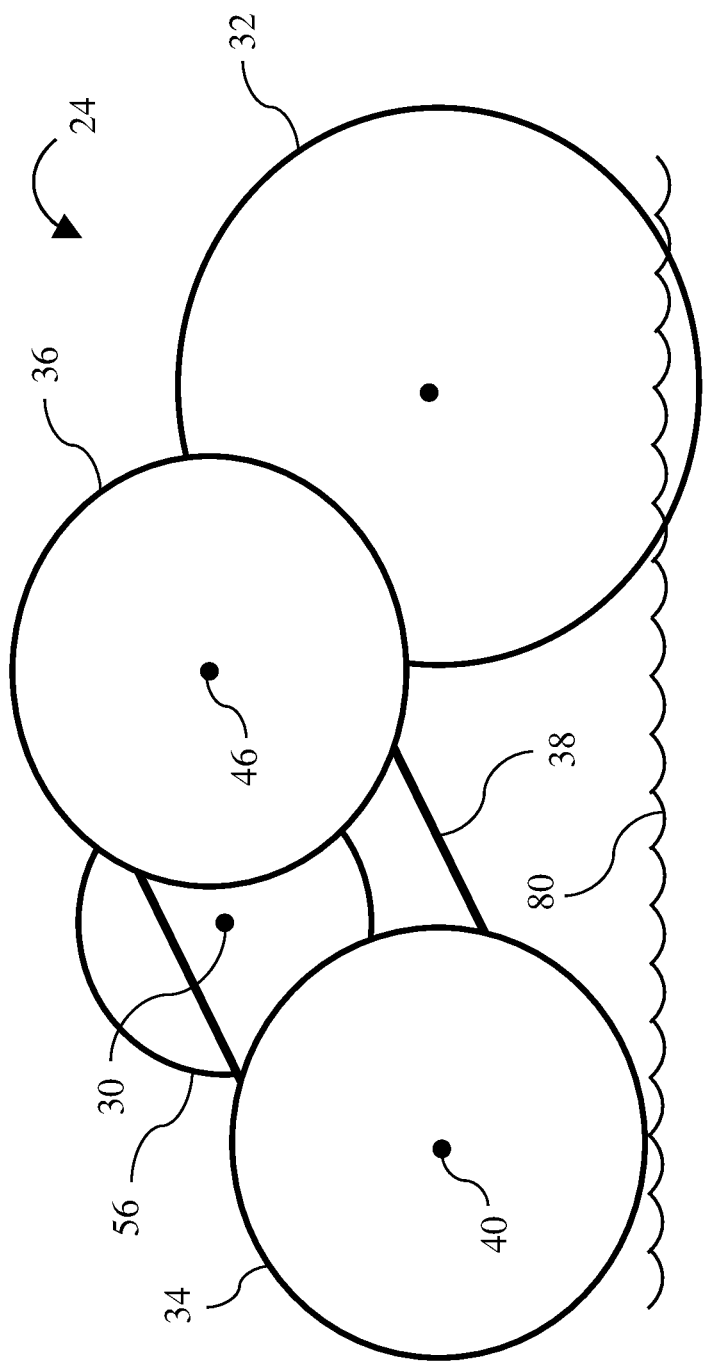
FIG. 3 is an end view of the continuously variable transmission of FIG. 2.

FIG. 3 shows an end view of gearbox 24. The gearbox and differential are enclosed in a housing. Fluid 80 is contained in the bottom of the housing. During operation, a pump draws fluid from the bottom of the housing and distributes it to various parts of the gearbox for lubrication. Additionally, some of the fluid is pressurized and routed to shift elements to engage the shift elements. Pressurized fluid is also provided to one side of each sheave to maintain clamping pressure on the belt to prevent slippage. After the lubrication fluid flows past various components, it drains back to the bottom of the housing by gravity. The placement of the various shaft axes keeps belt 40 and most of sheaves 34 and 36 out of the fluid sump. This reduces parasitic drag.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A transmission comprising:
    an input on a first axis;
    a variator configured to transmit power between a first sheave on a second axis and a second sheave on a third axis wherein the second and third axes are offset from the first axis;
    first and third shift elements configured to establish low and high recirculating power flow paths; and
    second and fourth shift elements configured to establish mid-range and reverse non-recirculating power flow paths.

2. The transmission of claim 1 wherein all power transmitted from the input to an output in the mid-range and the reverse power flow paths is transmitted by the variator from the first sheave to the second sheave.

3. The transmission of claim 2 wherein the low and high power flow paths are recirculating power flow paths in which power is transferred by the variator from the second sheave to the first sheave while power is being transferred from the input to the output.

4. The transmission of claim 1 further comprising:
    a first gear fixedly coupled to the input; and
    a second gear meshing with the first gear and fixedly coupled to the first sheave.

5. The transmission of claim 4 further comprising an intermediate shaft supported for rotation about the third axis and selectively held against rotation by the fourth shift element.

6. The transmission of claim 5 further comprising:
    a planetary gearset having a first planetary element fixedly coupled to the second sheave, a second planetary element fixedly drivably connected to an output, and a third planetary element fixedly coupled to the intermediate shaft; and
    wherein the second shift element selectively couples two of the first planetary element, the second planetary element, and the third planetary element to each other.

7. The transmission of claim 6 wherein the planetary gearset is a simple planetary gearset having a sun gear as the first planetary element, a ring gear as the second planetary element, and a carrier as the third planetary element.

8. The transmission of claim 6 further comprising:
    third and fourth gears coupled to the input; and
    fifth and sixth gears meshing with the third and fourth gears respectively and coupled to the intermediate shaft.

9. The transmission of claim 8 wherein:
    the third gear is selectively coupled to the input by the first shift element; and
    the fifth gear is fixedly coupled to the intermediate shaft.

10. The transmission of claim 9 wherein:
    the fourth gear is selectively coupled to the input by the third shift element; and
    the sixth gear is fixedly coupled to the intermediate shaft.

11. A transmission comprising:
    an input fixedly coupled to a first gear,
    a variator having first and second sheaves;
    a second gear meshing with the first gear and fixedly coupled to the first sheave;
    a sun fixedly coupled to the second sheave;
    a ring operatively selectively coupled to the sun;
    third and fourth gears coupled to the input; and
    fifth and sixth gears coupled to a carrier and meshing with the third and fourth gears respectively.

12. The transmission of claim 11 further comprising a plurality of planet gears supported for rotation with respect to the carrier and meshing with both the sun and the ring.

13. The transmission of claim 12 wherein:
    the third gear is selectively coupled to the input; and
    the fifth gear is fixedly coupled to the carrier.

14. The transmission of claim 13 wherein:
    the fourth gear is selectively coupled to the input; and
    the sixth gear is fixedly coupled to the carrier.

15. The transmission of claim 14 further comprising a brake configured to selectively hold the carrier against rotation.

16. A transmission comprising:
    an input on a first axis;
    a variator configured to transmit power between a first sheave on a second axis and a second sheave on a third axis wherein the second and third axes are offset from the first axis; and
    a controller programmed to
        launch a vehicle using a first recirculating power flow path in which power flows from the second sheave to the first sheave,
        adjust a variator ratio,
        shift from the first recirculating power flow path to a first non-recirculating power flow path in which power flows from the first sheave to the second sheave wherein the variator ratio is adjusted such that a speed ratio between the input and an output does not change during this shift, and
        shift from the first non-recirculating power flow path to a second recirculating power flow path in which power flows from the second sheave to the first sheave.

17. The transmission of claim 16 wherein the controller is further programmed to adjust the variator ratio such that the shift from the first non-recirculating power flow path to the second recirculating power flow path does not change the speed ratio.

18. The transmission of claim 16 wherein the controller is further programmed to launch the vehicle in a reverse direction using a second non-recirculating power flow path in which power flows from the first sheave to the second sheave.

* * * * *